United States Patent [19]

Larsen

[11] 4,343,393
[45] Aug. 10, 1982

[54] FEEDER FOR FRUITS AND THE LIKE
[75] Inventor: Gregory J. Larsen, Lakeland, Fla.
[73] Assignee: FMC Corporation, Chicago, Ill.
[21] Appl. No.: 120,967
[22] Filed: Feb. 13, 1980
[51] Int. Cl.³ .................... B65G 47/04; B65G 13/02
[52] U.S. Cl. .................................... 198/533; 198/786
[58] Field of Search ............ 198/786, 533, 389, 445, 198/446; 193/35 C, 2 R, 38, 41

[56] References Cited
U.S. PATENT DOCUMENTS

| 477,093 | 6/1892 | Wead | 198/786 |
|---|---|---|---|
| 1,918,398 | 7/1933 | Johnson | 193/2 R |
| 3,040,864 | 6/1962 | Belk | 198/478 |
| 3,317,027 | 5/1967 | Anderson | 198/786 |
| 3,367,473 | 2/1968 | Kingsbury | 198/786 |
| 3,687,263 | 8/1972 | Randrup | 198/389 |

FOREIGN PATENT DOCUMENTS 7411432  3/1975  Netherlands ................ 198/786

Primary Examiner—Robert B. Reeves
Assistant Examiner—Brian Bond
Attorney, Agent, or Firm—Richard B. Megley; Louis J. Pizzanelli

[57] ABSTRACT

A hopper for feeding fruit in several transversely spaced lanes from a supply conveyor to the pick-up positions of a fruit feeder includes several drums mounted in spaced and downwardly inclined relationships. The spacing between the adjacent drums is adapted for the reception of a single file of fruit, and the inclination of the drums is sufficient to cause the fruit to gravitate downwardly to the feeder pick-up positions. A push-pull drive mechanism is provided to pivot the drums back and forth about their axes of rotation to cause the fruit to spin as they gravitate downwardly between the drums. Such spinning action facilitates rapid feeding of the fruit downwardly between the drums and, in particular, prevents irregularly shaped citrus fruit such as tangerines or lemsons from becoming enlodged against each other to thereby interrupt their flow to the pick-up positions.

3 Claims, 6 Drawing Figures

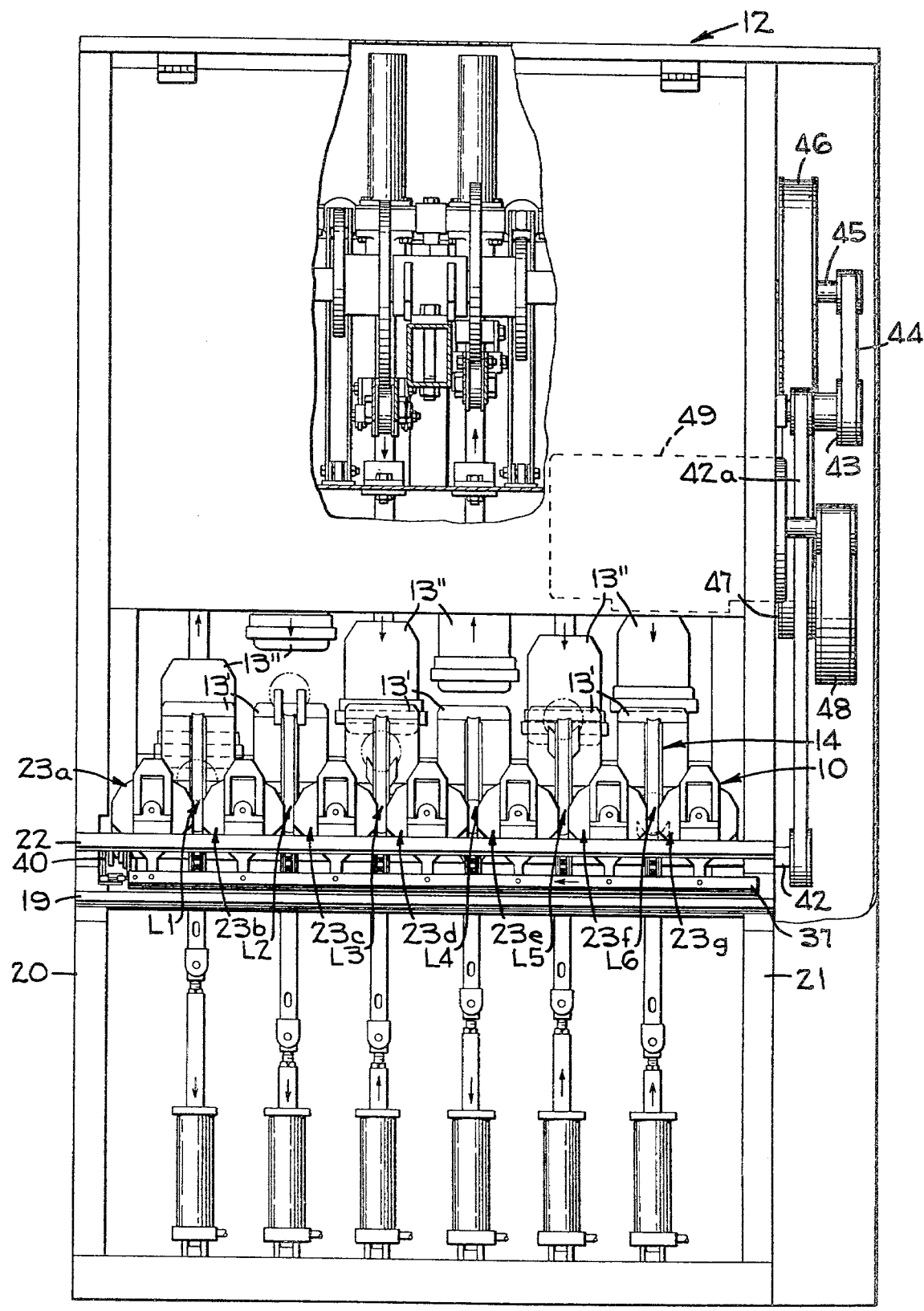
FIG_1

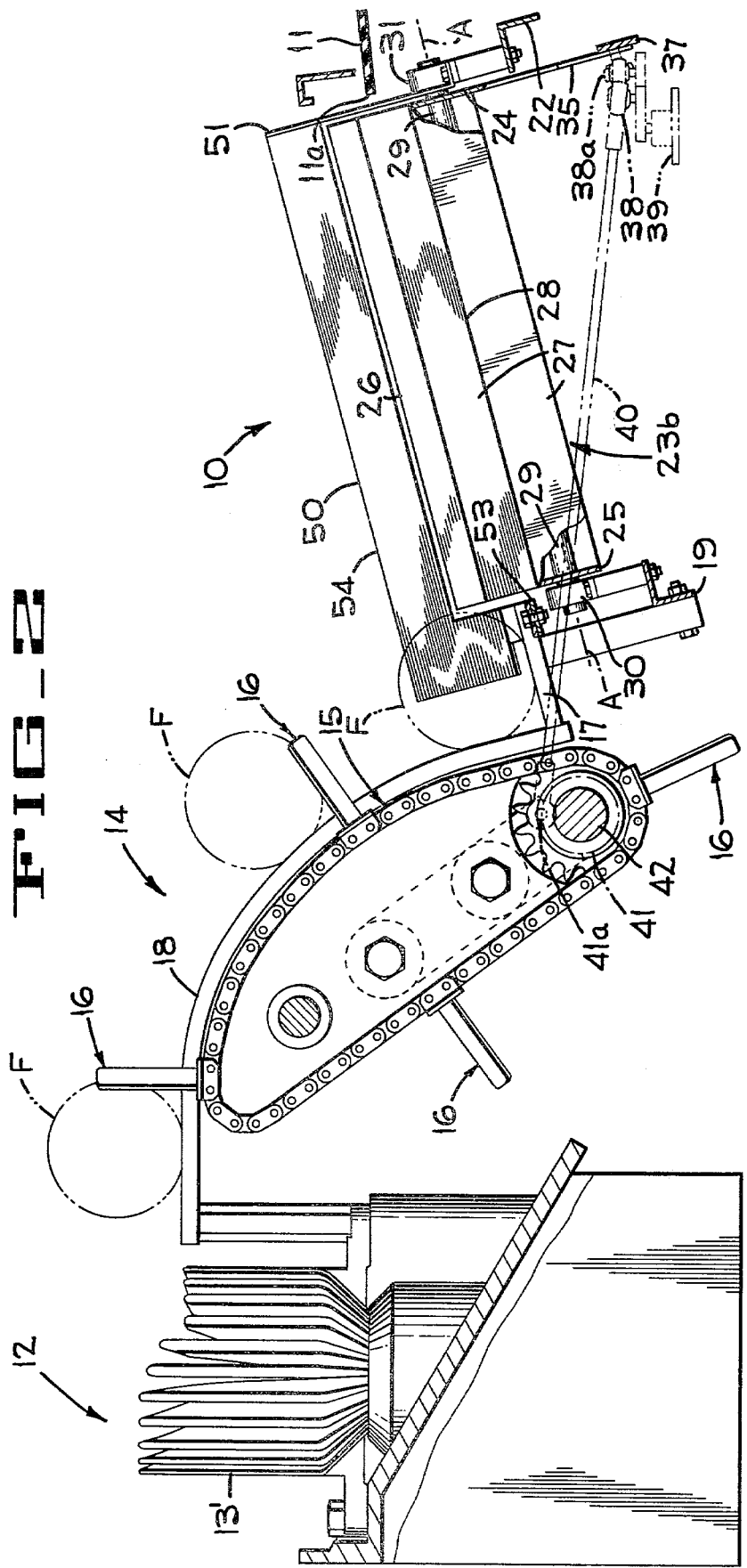

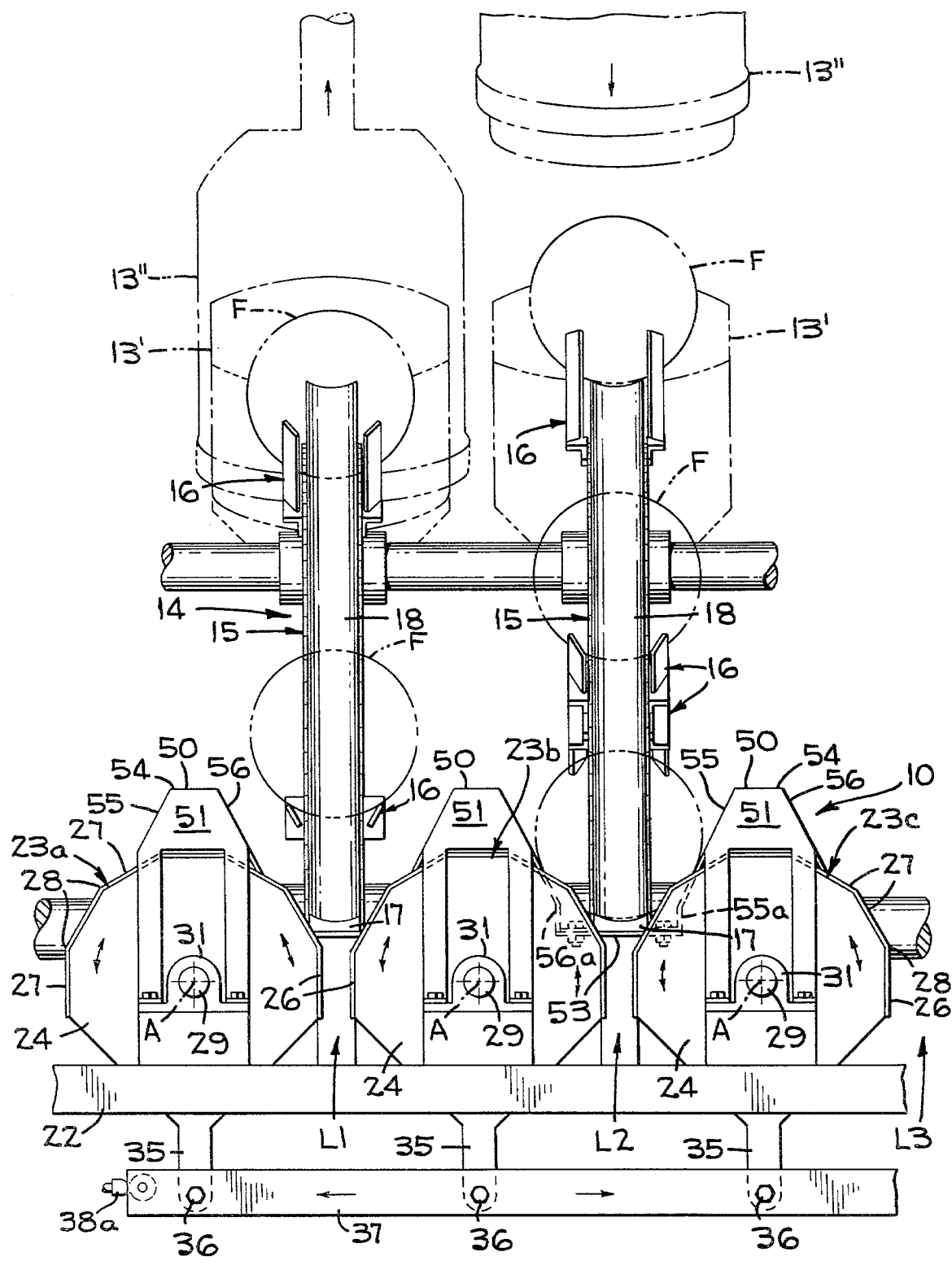
FIG_3

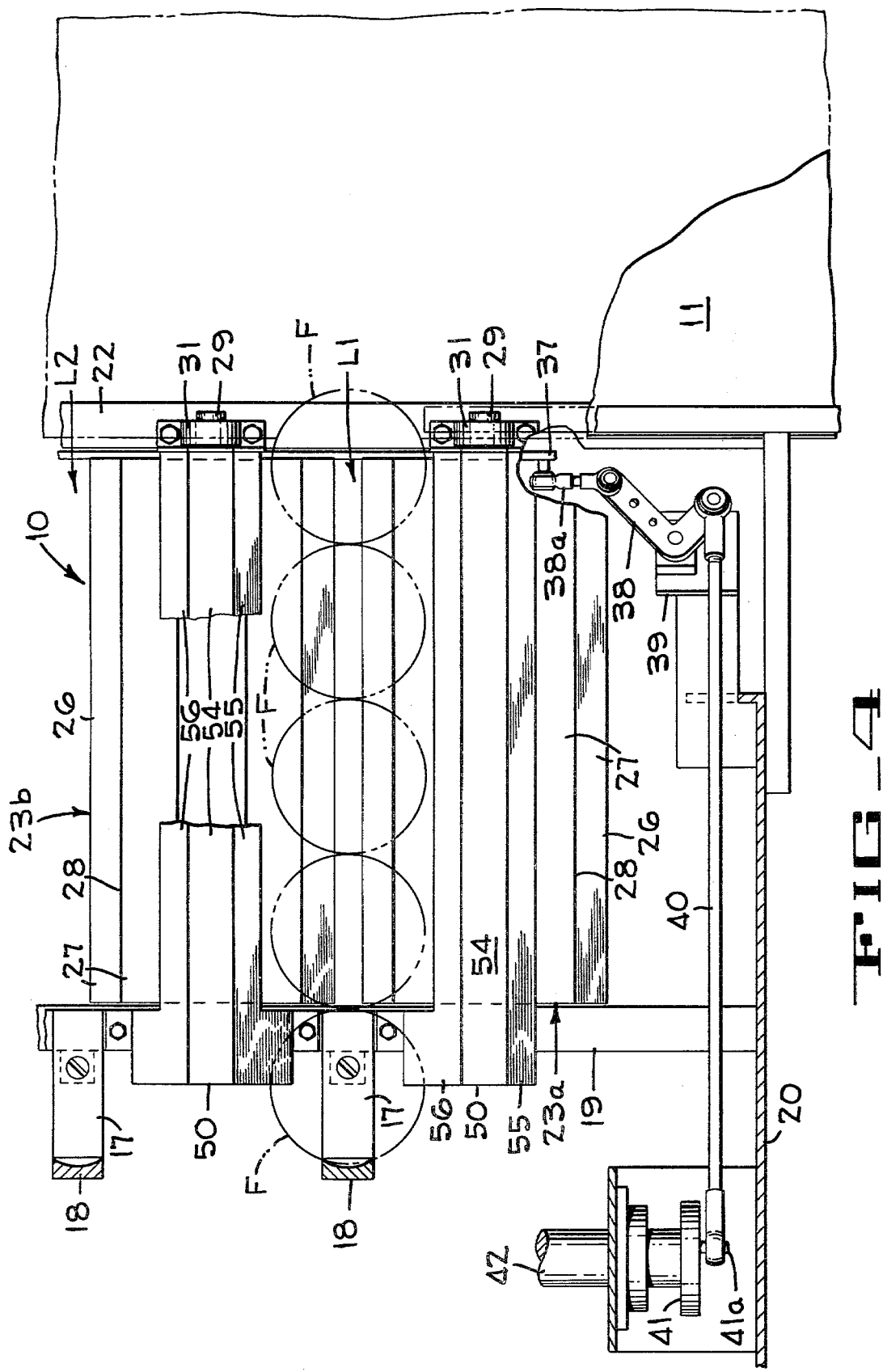

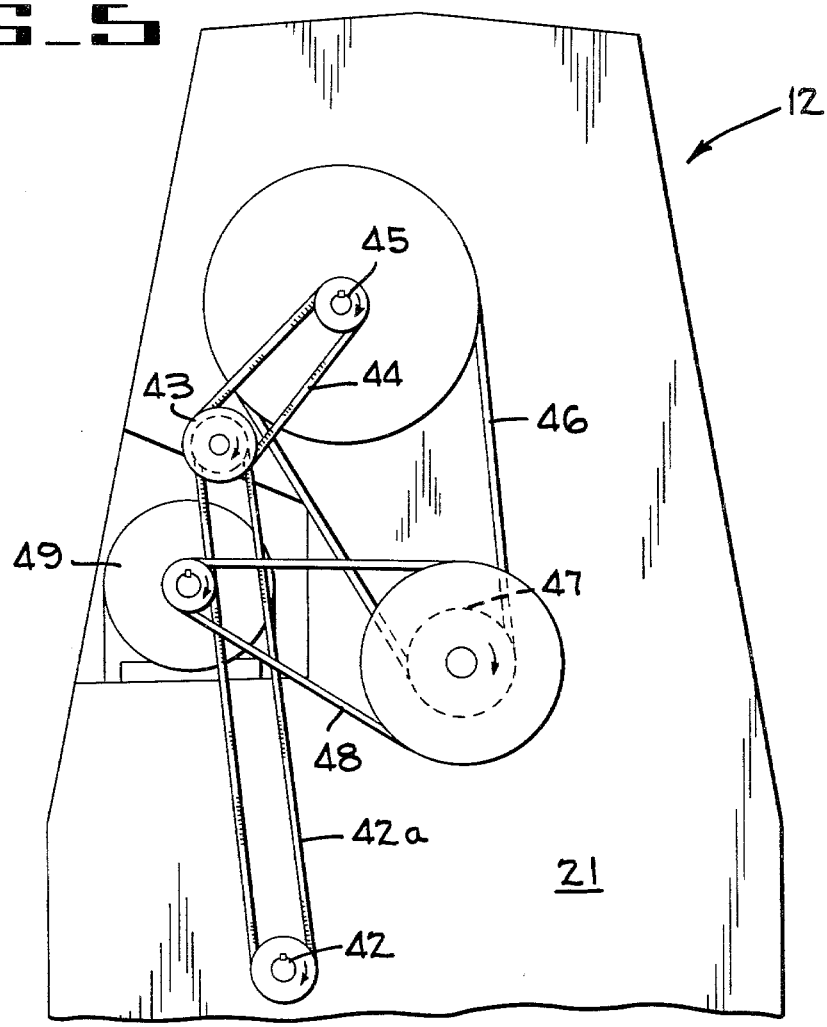
FIG_5
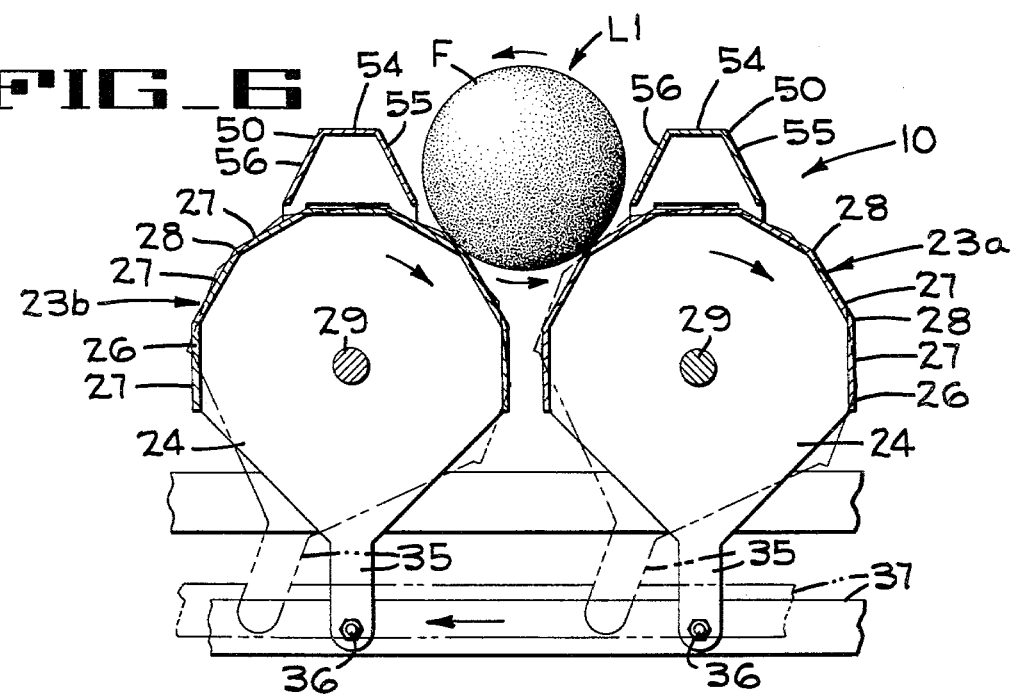
FIG_6

FEEDER FOR FRUITS AND THE LIKE

BACKGROUND OF THE INVENTION

1. Field of the Invention

The present invention pertains to fruit conveying apparatus, and more particularly, it pertains to apparatus for feeding fruit in transversely spaced single files.

2. Description of the Prior Art

U.S. Pat. No. 3,040,864 to W. C. Belk illustrates a high speed feeder adapted for use with a citrus fruit juice extractor. The juice extractor generally described in the Belk patent includes several lower cups that are rigidly mounted in a linear array, several upper cups that are reciprocatably mounted directly above the lower cups, and a drive mechanism connected to the upper cups. The upper and lower cups include circumferentially spaced fingers which are adapted to interdigitate to compress a fruit as the upper cups are lowered to thereby extract the juice from the fruit. The high speed feeder specifically described in the Belk patent includes a hopper that is adapted to receive fruit in single files from a bulk supply conveyor and a rotary feeder that receives the fruit from the hopper and feeds the fruit to the extractor when the upper cups are in their elevated positions.

The hopper shown in the aforementioned Belk patent includes a metal frame structure which includes a plurality of troughs that are uniformly transversely spaced across the hopper to define fruit feeding lanes and that are separated by upright wall members. An eccentric shaft drive mechanism is used to oscillate the entire frame structure to cause the fruits to roll or slide down the respective lanes onto support bridges. The rotary feed mechanism engages the fruit supported on the bridges, elevates them to positions above the lower cups, and then propels the fruit into the lower extractor cups.

A problem with the hopper shown in the aforementioned Belk patent is that irregularly shaped fruit, such as tangerines or lemons, tend to become clogged between the upright wall members. For example, when tangerines are handled, the flat portions thereof tend to bind against each other to prevent the individual tangerines from moving rapidly down the troughs in response to the oscillation thereof. In view of the severity of this clogging problem, operators are sometimes provided to oversee the operation of the hopper and to dislodge any fruit clogged in the hopper lanes.

Another problem of the hopper shown in the Belk patent relates to the throughput capacity of the hopper. Recent efforts have been made to increase the extraction rate of the aforementioned type of citrus fruit extractor to 150 fruit per cup per minute. At such a high required feed rate, it is anticipated that the prior art hopper will not be operative to feed fruit to match the speed of the extractor. It will be recognized that this feeding problem cannot be solved by simply mounting the prior art hopper at a steeper angle relative to the horizontal, because such increased inclination will cause the fruit in each lane to tumble over each other and to accumulate at the lower end of the troughs thereby tending to cause the feeding of more than one fruit at a time to the rotary feeder.

SUMMARY OF THE INVENTION

The hopper of the present invention overcomes the aforementioned problems of the known prior art hoppers. According to one aspect of the present invention, a hopper that is particularly useful for feeding citrus fruit and the like includes a pair of elongate, curved fruit support walls that are mounted in parallel transversely spaced relationship and at an angle relative to the horizontal to form a chute that causes the fruit supported therebetween to gravitate toward the lower end thereof. One or both of the support walls are rotated to cause the fruit thereon to rotate in a plane that is transverse to the direction of travel of the fruit between the support walls and to eliminate any static friction bond between the fruit and the support walls to assure a fast feed. In the preferred embodiment, both of the support walls are simultaneously oscillated through limited arcs back and forth to cause the fruits supported between such walls to first rotate in one direction and then rotate in the opposite direction.

An important advantage of the feeder of the present invention is that the rotating action induced by the rotating support walls causes irregularly shaped fruit to readily align themselves in single file between the walls, thereby eliminating the clogging problem associated with the known prior art fruit hoppers. Also, the rotating action reduces drag between the fruit and the walls so that the fruit can be fed more rapidly.

BRIEF DESCRIPTION OF THE DRAWINGS

FIG. 1 is a diagrammatic front elevation of a citrus fruit juice extractor that is adapted to receive fruit fed from the fruit hopper of the present invention.

FIG. 2 is an enlarged, fragmentary, side elevational view in partial section of one of the lower extractor cups, the fruit feeder and the fruit hopper.

FIG. 3 is an enlarged, fragmentary, front elevational view of the fruit hopper of the present invention.

FIG. 4 is an enlarged, fragmentary plan view of the hopper that is partially broken away.

FIG. 5 is a relatively reduced, side elevational view that shows the drive arrangement for the hopper.

FIG. 6 is an enlarged, fragmentary transverse sectional view that illustrates the operation of the hopper.

DESCRIPTION OF THE PREFERRED EMBODIMENT

With reference to FIGS. 1, 2 and 4, the fruit feeding hopper 10 of the present invention is arranged to receive loose fruit from a bulk supply of fruit on a tilted conveyor belt 11 (FIGS. 2 and 4) and to feed such fruit in single file lanes L1–L6 (FIG. 1) to a fruit processing apparatus. In the arrangement shown in FIGS. 1 and 2, such fruit processing apparatus will be seen to comprise a citrus juice extractor 12 including six lower cups 13 and six opposing upper cups and a fruit feeder 14 for feeding the fruits individually and in timed sequential relation with the movements of the upper cups. The juice extractor 12 shown in FIG. 1 is completely described in the copending U.S. patent application of Gregory J. Larsen et al entitled Citrus Fruit Juice Extractor, filed concurrently herewith and identified by Ser. No. 12,966 now U.S. Pat. No. 4,309,943. The fruit feeder 14 is described in the copending U.S. patent application of Elmer F. Frost et al entitled High Speed Fruit Feeding Apparatus, filed concurrently herewith, and identified by Ser. No. 12,966 now U.S. Pat. No. 4,309,943. The disclosure of such copending patent applications are incorporated herein by reference. It will be understood that the hopper 10 of the present invention is not limited to use with the juice extractor and feeder shown in the aforementioned copending applications, and that the structures and operation of such extractor and feeder are not critical to an understanding of the present invention.

For purposes of the present description, it may be noted that the feeder 14 includes several spaced chain conveyors 15 each having finger units 16 that are adapted to engage the individual fruit at a pick-up position as supported on an inclined support bridge 17 (FIG. 2). Such fruit at the pick-up positions also bear against the lower ends of arched bridges 18, which bridges 18 are connected to the inclined support bridges 17 (FIG. 2). The arched bridges 18 cooperate with the chain conveyors 15 to guide the fruit as they are elevated and propelled by the finger units. The hopper 10 is adapted to feed fruits in transversely spaced lanes L1-L6 (FIG. 1) aligned with the various chain conveyors 15 so that a single fruit is consecutively fed to each bridge 18 in rapid succession.

The hopper 10 includes a frame comprising a rail 19 (FIGS. 2 and 4) that extends transversely between side panels 20, 21 (FIG. 1) of the extractor 12 and a parallel rail 22 that is also mounted between the side panels of the extractor but at a higher elevation than the rail 19. Referring to FIGS. 1 through 4, the hopper includes seven semi-cylindrical support members or drums 23a-23g that are rotatably mounted in uniform transverse spacings to the rails 19 and 22. Each drum includes a front wall 24, a similarly shaped rear wall 25 (FIG. 2), and a convex, elongate fruit support wall 26 extending between the front and rear walls. Each support wall 26 has an identical semi-cylindrical shape that is symmetrical about a central axis A—A (FIGS. 2 and 3). Support wall 26 includes flat rectangular facets 27 which extend longitudinally thereof and which are joined at several corners 28 that are equiangularly spaced about the central axis A—A. In particular, the support wall 26 has a cross-sectional profile of a regular, twelve-sided polygon that is truncated below the axis thereof so that only seven sides remain (FIG. 6). It will be seen in FIG. 4 that the fruit support walls 26 are several times longer than the diameter of the fruit to be handled so that several fruit may be supported in the space between adjacent support walls.

As shown in FIGS. 1 through 4, the drums 23a-23g are mounted to the rails 19 and 22 for rotational oscillation about their respective axes A—A so that the drums are parallel to each other, are downwardly inclined at approximately 15° below the horizontal, and are transversely spaced by uniform intervals to form the six fruit feeding lanes L1-L6 between adjacent drums. To provide such a rotatable mounting, a shaft 29 (FIGS. 2, 3, 4 and 6) is rigidly mounted between the front and rear walls 24 and 25 of each drum at the central axis A—A thereof. The shaft 29 of each drum is journaled within bearings 30 and 31 that are attached to the rails 19 and 22, respectively (FIG. 2). It will be seen that the rails are mounted to the extractor side panels 20, 21 so that the shafts 29 of the respective drums are sloped at the aforesaid 15° angle below the horizontal. As shown in FIGS. 2 and 4, the tilted conveyor belt 11 is mounted relative to the hopper 10 such that its lower edge 11a (FIG. 2) is positioned adjacent the uppermost ends of the drums and sufficiently above the shafts 29 to enable fruit to readily roll over the adjacent edge of the conveyor belt in directions that are transverse of the direction of travel of the conveyor belt and fall into the gaps between the drums. The downward inclination of the drums is sufficient to cause the fruit to rapidly gravitate from the upper ends thereof to the support bridges 17 when the fruit are spun by the drums, as shall be hereinafter described.

The drums 23a-23g are all connected to a push-pull drive mechanism which causes them to pivot back and forth through limited arcs about their respective axes A—A. The front wall 24 of each drum includes an arm portion 35 (FIGS. 2 and 3) that extends downwardly therefrom, and the arm portions 35 of all of the drums are pivotally attached by bolts 36 (FIG. 3) to a push-pull rod 37. As shown in FIG. 4, a link 38a is pivotally attached to the end of the push-pull rod 37 and to one arm of a bellcrank 38. As seen in FIG. 4, the arm of the bellcrank which is connected to the link 38a is provided with a plurality of holes so that the throw of the crank arm can be varied. This adjustment of the amount of oscillatory movement imparted to the drums 23a-23g is necessary to accommodate fruit of different degrees of roundness. The bellcrank 38 is mounted upon a bracket 39 that is, in turn, attached to the side panel 20 of the extractor. The other arm of the bellcrank is connected to one end of a drive rod 40, and the opposite end of the drive rod is connected to an eccentrically positioned pin 41a which extends outwardly from the side of a crank disc 41. The crank disc is, in turn, mounted to the end of the drive shaft 42 which powers the chain conveyors 15 of the feeder 14. As illustrated in FIGS. 1 and 5, the feeder drive shaft 42 is driven by a belt 42a that is, in turn, driven by an idler 43. The idler 43 is, in turn, driven by a belt 44 mounted to the camshaft 45 of the extractor 12 that drives the upper cups therein into juice-extractive engagement with the lower cups 13 therein. The extractor camshaft is, in turn, driven by a belt 46 which is received on a further idler 47 that is, in turn, driven by a belt 48 connected to the drive motor 49 of the extractor. It will be understood that as the feeder drive shaft 42 (FIG. 4) is driven, the crank disc 41 will reciprocate the drive rod 40, which motion is translated through the bellcrank 38 to alternately push and pull the push-pull rod 37, thereby rotating or oscillating the drums 23a-23g back and forth through an angle corresponding to the throw of the push-pull rod.

The hopper 10 further includes partitions 50 that are longitudinally mounted above the drums 23a-23g with sufficient spacing above the drums to permit the drums to rotate thereunder. Partitions 50 are provided for the purpose of guiding fruit from the belt conveyor 11 in single files into the fruit feeding lanes L1-L6. With the exception of the partitions over the end drums 23a and 23g, the partitions are identical. Each includes a front end wall 51 that is bolted to the upper rail 22 above the bearing 31 (FIG. 3). Each partition further includes a top wall 54 and flat side walls 55 and 56 that diverge downwardly from the side edges of the top wall. The lower edges of the opposing side walls 55 and 56 of adjacent partitions are transversely spaced so that the fruit F (FIG. 6) that are properly aligned in the respective lanes L1-L6 normally rest directly upon the convex support surfaces 26 of the associated adjacent drums without contacting such opposing partition walls 55 and 56. Extensions 55a and 56a (FIG. 3 in phantom outline) are formed at the downstream ends of the side walls 55 and 56, respectively, for the purpose of supporting the sides of a fruit that is located on (or directly over in the case of a larger fruit) the support bridge 17. Such extensions of the partition side walls are sufficiently spaced from the bridges 17 to permit the finger units 16 of the feeder to move therebetween. As also shown in phantom lines in FIG. 3, brackets are formed at the lower ends of the extensions, and such brackets are bolted to strips 53 that are attached to the support bridges 17. The partitions over the end drums 23a and 23g are the same as heretofore described except that there are no extensions 55a, 56a on the outer side walls 55 (23a) and 56 (23g).

It should be further noted that as shown in FIGS. 3 and 6, the drums 23a–23g are all connected to the push-pull rod 37 so that the raised corners 28 of the support walls 26 of the drums are similarly positioned relative to the horizontal. That is, the arms 35 of the drums are pivotally attached to the push-pull rod so that the corners 28 of the fruit support walls of each pair of drums diametrically oppose each other (FIG. 6).

In operation, fruit are fed to the hopper 10 upon the tilted conveyor belt 11 (FIG. 4). Due to the transverse inclination of the conveyor belt, the fruit accumulate adjacent the lower edge 11a thereof and roll therefrom into the lanes L1–L6 between adjacent drums 23a–23g of the hopper. As just stated, the partitions 50 positioned directly over the drums prevent more than a single fruit from being fed at a time into each of the lanes L1–L6. As soon as a fruit drops onto the drums over the edge 11a, the cyclical rotation of the drums causes the fruit to rotate counter to the direction of rotation of the drums. Such rotating action is illustrated in FIG. 6, wherein it will be further noticed that the fruit F is rotated by both of the adjacent drums of a particular feeding lane. When the drums are rotated in the opposite direction, the fruit will be rotated in the opposite direction. Such oscillatory rotative movement of the fruit causes the fruit to separate from each other in a single file and to gravitate rapidly in such single file down the drums to the support bridges 17 at the bottom of the hopper where they can be picked up by the feeder 14. Briefly stated, the rotating action assures that fruit will be successively fed one at a time to each chain conveyor 15 of the feeder 14 to assure proper operation of the feeder and the associated juice extractor 12.

Although the best mode contemplated for carrying out the present invention has been herein shown and described, it will be apparent that modification and variation may be made without departing from what is regarded to be the subject matter of the invention.

What is claimed is:

1. A feeding apparatus in which a supply of randomly arranged substantially spherical articles are segregated to progress along an inclined feed path terminating at a downstream transfer station where the leading article of an abutting row of articles is transferred to a processing machine, said feeding apparatus comprising:
inclined laterally spaced article support members defining therebetween a downwardly extending feed path,
means mounting said support members for oscillatory movement,
means for simultaneously oscillating said support members in successive clockwise and counter-clockwise directions so that articles supported thereby are partially revolved in opposite directions to impart a side-to-side swaying action thereto thereby to enhance movement of the articles by gravity down said feed path,
said support members having generally undulating surfaces defined by a plurality of ridges extending longitudinally thereof at the intersections of generally arcuately spaced rectangular panels, thereby to impart limited upward movement to said articles in addition to side-by-side swaying movement thereof as said articles progress along said feed path, thereby causing said articles to partake of multidirectional movement to preclude stoppage of article flow along said feed path by static friction thereof,
elongated stationary means overlying each said support member thereby to laterally confine said articles to said path and prevent lateral passage of said articles transversely of said support members during said swaying movement, and,
said oscillating means further including a connection therein for adjusting the arc of oscillatory motion imparted to said support member.

2. The feeding apparatus of claim 1 wherein said surfaces of said support members are of substantially polygonal cross section and extend generally along an arc of about 180° about the respective centers of oscillatory movement.

3. The feeding apparatus of claims 1 or 2 further including means forming a continuation of said feed path and extending beyond said support members for retaining the leading article in said feed path in a state of relative repose awaiting transfer to the processing machine.

* * * * *